United States Patent
Blankenship et al.

(10) Patent No.: US 10,135,674 B2
(45) Date of Patent: *Nov. 20, 2018

(54) WIRELESS COMMUNICATION SYSTEM WITH SINGLE-SUBBAND USER EQUIPMENT

(71) Applicant: Telefonaktiebolaget LM Ericsson (publ), Stockholm (SE)

(72) Inventors: Yufei Blankenship, Kildeer, IL (US); Kazuyoshi Uesaka, Kawasaki (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 206 days.

This patent is subject to a terminal disclaimer.

(21) Appl. No.: 15/138,608

(22) Filed: Apr. 26, 2016

(65) Prior Publication Data

US 2016/0241324 A1    Aug. 18, 2016

Related U.S. Application Data

(63) Continuation of application No. 15/031,803, filed as application No. PCT/SE2016/050072 on Feb. 1, 2016, now Pat. No. 9,929,902.

(Continued)

(51) Int. Cl.
*H04W 4/70* (2018.01)
*H04L 12/24* (2006.01)
(Continued)

(52) U.S. Cl.
CPC ....... *H04L 41/0803* (2013.01); *H04B 7/0417* (2013.01); *H04B 7/0632* (2013.01);
(Continued)

(58) Field of Classification Search
CPC .... H04L 41/0803; H04L 1/0026; H04W 4/70; H04B 7/0417; H04B 7/0632
See application file for complete search history.

(56) References Cited

U.S. PATENT DOCUMENTS

2009/0207784 A1   8/2009 Lee et al.
2011/0007779 A1   1/2011 Nanri
(Continued)

FOREIGN PATENT DOCUMENTS

RU    2010132856 A    2/2012

OTHER PUBLICATIONS

3rd Generation Partnership Project, "3rd Generation Partnership Project; Technical Specification Group Radio Access Network; Evolved Universal Terrestrial Radio Access (E-UTRA); Physical channels and modulation (Release 12)", Technical Specification, 3GPP TS 36.211 V12.0.0, Dec. 1, 2013, pp. 1-120, 3GPP, France.

(Continued)

*Primary Examiner* — Wei Zhao
(74) *Attorney, Agent, or Firm* — Coats & Bennett, PLLC

(57) ABSTRACT

A radio network node is configured to operate within a system bandwidth comprising multiple subbands and to serve a user equipment limited to operating within only one subband during any given subframe. The radio network node is configured to generate configuration information and to send that configuration information to the user equipment. In some embodiments, the configuration information indicates a location within the system bandwidth of a single subband within which the user equipment is to be operated during a subframe. Alternatively or additionally, the configuration information indicates a mode according to which the user equipment is to feedback channel state information to the radio network node. According to the indicated mode, in a subframe where CQI is reported, the user equipment shall report one wideband CQI value which is calculated assuming transmission on the subband within which the user equipment is configured to operate in that subframe.

62 Claims, 10 Drawing Sheets

Related U.S. Application Data

(60) Provisional application No. 62/109,967, filed on Jan. 30, 2015.

(51) Int. Cl.

| | | |
|---|---|---|
| *H04B 7/06* | (2006.01) | |
| *H04L 1/00* | (2006.01) | |
| *H04L 5/00* | (2006.01) | |
| *H04W 72/04* | (2009.01) | |
| *H04B 7/0417* | (2017.01) | |
| *H04W 84/04* | (2009.01) | |
| *H04W 76/27* | (2018.01) | |

(52) U.S. Cl.
CPC ........... *H04B 7/0639* (2013.01); *H04L 1/003* (2013.01); *H04L 1/0026* (2013.01); *H04L 5/0057* (2013.01); *H04L 5/0082* (2013.01); *H04L 5/0094* (2013.01); *H04L 41/12* (2013.01); *H04W 4/70* (2018.02); *H04W 72/0446* (2013.01); *H05K 999/99* (2013.01); *H04L 5/0023* (2013.01); *H04W 76/27* (2018.02); *H04W 84/042* (2013.01)

(56) References Cited

U.S. PATENT DOCUMENTS

| | | |
|---|---|---|
| 2011/0194510 A1 | 8/2011 | Gaal et al. |
| 2013/0170435 A1* | 7/2013 | Dinan ................... H04L 45/50 370/328 |
| 2013/0343299 A1 | 12/2013 | Sayana et al. |
| 2014/0098781 A1 | 4/2014 | Vos et al. |
| 2014/0129700 A1 | 5/2014 | Mehta et al. |
| 2014/0314031 A1* | 10/2014 | Kim ...................... H04L 1/1861 370/329 |
| 2017/0164350 A1 | 6/2017 | Sun et al. |
| 2017/0201308 A1* | 7/2017 | Park ...................... H04B 7/0626 |

OTHER PUBLICATIONS

3rd Generation Partnership Project, "3rd Generation Partnership Project; Technical Specification Group Radio Access Network; Evolved Universal Terrestrial Radio Access (E-UTRA); Physical layer procedures (Release 12)", Technical Specification, 3GPP TS 36.213 V12.0.0, Dec. 1, 2013, pp. 1-186, 3GPP, France.

3rd Generation Partnership Project, "3rd Generation Partnership Project; Technical Specification Group Radio Access Network; Study on provision of low-cost Machine-Type Communications (MTC) User Equipments (UEs) based on LTE (Release 12)", Technical Report, 3GPP TR 36.888 V12.0.0, Jun. 1, 2013, pp. 1-55, 3GPP, France.

Huawei et al., "TM and CQI reporting reduction for LC UEs", 3GPP TSG RAN WG1 Meeting #79, Nov. 17-21, 2014, pp. 1-5, San Francisco, US R1-144576.

Intel Corporation, "UE complexity reduction for MTC," 3GPP TSG RAN WG1 Meeting #79, Nov. 17-21, 2014, pp. 1-5, San Francisco, R1-144658.

Interdigital, "Reduced UE complexity for Rel-13 MTC3," 3GPP TSG RAN WG1 Meeting #79, Nov. 17-21, 2014, pp. 1-5, San Francisco, R1-145211.

Eberspacher, J. et al., "Air Interface—Physical Layer", GSM—Architecture, Protocols and Services, 3rd Edition , Feb. 1, 2009, pp. 57-119, Wiley.

\* cited by examiner

Table 7.2.3-1: 4-bit CQI Table

| CQI index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 6

|  | | PMI Feedback Type | | |
|---|---|---|---|---|
|  | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

FIG. 12

|  | | PMI Feedback Type | |
|---|---|---|---|
|  | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

FIG. 13

WIRELESS COMMUNICATION SYSTEM WITH SINGLE-SUBBAND USER EQUIPMENT

RELATED APPLICATIONS

This application is a Continuation Application of, and claims priority from, U.S. patent application Ser. No. 15/031,803 filed Apr. 25, 2016 which is a National Phase of International Application No. PCT/SE2016/05007 filed Feb. 1, 2016, which in its turn claims priority to U.S. Provisional patent Application Ser. No. 62/109,967 filed Jan. 30, 2015, the entire contents of which are incorporated herein by reference.

TECHNICAL FIELD

The present application relates generally to a wireless communication system, and particularly to a wireless communication system in which a user equipment is limited to operating in only one subband during any given subframe.

BACKGROUND

Machine-Type Communication (MTC) is an important revenue stream for operators and has a huge potential from the operator perspective. It is efficient for operators to be able to serve MTC user equipment (UE) using already deployed radio access technology. Therefore 3GPP Long Term Evolution (LTE) has been investigated as a competitive radio access technology for efficient support of MTC. Lowering the cost of MTC UE is an important enabler for implementation of the concept of "internet of things". MTC UE used for many applications will require low operational power consumption and are expected to communicate with infrequent small burst transmissions. In addition, there is a substantial market for the Machine-to-Machine (M2M) use cases of devices deployed deep inside buildings which would require coverage enhancement in comparison to the defined LTE cell coverage footprint.

3GPP LTE Rel-12 has defined UE power saving mode allowing long battery lifetime and a new UE category allowing reduced modem complexity. In Rel-13, further MTC work is expected to further reduce UE cost and provide coverage enhancement. Cost reduction is enabled at least in part by introducing reduced UE bandwidth, e.g., of 1.4 MHz in downlink and uplink within any system bandwidth (also referred to as carrier bandwidth).

Reducing UE bandwidth, however, in turn introduces challenges in the UE's ability to report pertinent channel state information (CSI) to the network. LTE for example conventionally supports wideband channel quality indicator (CQI) reporting, whereby a UE reports a CQI value representing the effective channel quality over the entire system bandwidth (e.g., for each component carrier when carrier aggregation is used). This CQI reporting mode is not usable by reduced bandwidth UEs.

SUMMARY

According to one or more embodiments, a user equipment is limited to operating within only one subband from the system bandwidth during any given subframe. The user equipment is configured, in a subframe where CQI is reported, to report one wideband CQI value which is calculated assuming transmission on the subband within which the user equipment is configured to operate in that subframe. Alternatively or additionally, the user equipment is configured to operate within a single subband, the location of which is indicated by the network. In some embodiments, the frequency location of this single subband varies every certain number of subframes, e.g., such that the single subband's location hops within or across the system bandwidth. When these embodiments are used in combination, the user equipment effectively reports wideband CQI across at least some of the full system bandwidth, just in different subframes.

More particularly, embodiments herein include a method implemented by a radio network node configured to operate within a system bandwidth comprising multiple subbands and to serve a user equipment limited to operating within only one subband during any given subframe. The method comprises generating configuration information that indicates a location within the system bandwidth of a single subband within which the user equipment is to be operated during a subframe. The method also comprises configuring the user equipment to operate within the single subband during said subframe by transmitting the configuration information to the user equipment.

Embodiments herein also include a method implemented by a user equipment served by a radio network node, wherein the radio network node is configured to operate within a system bandwidth comprising multiple subbands, wherein the user equipment is limited to operating within only one subband during any given subframe. The method comprises receiving from the radio network node configuration information that indicates a location within the system bandwidth of a single subband within which the user equipment is to be operated during a subframe. The method also comprises configuring the user equipment to operate within the single subband during said subframe according to the configuration information.

Embodiments further include a method implemented by a radio network node configured to operate within a system bandwidth comprising multiple subbands and to serve a user equipment limited to operating within only one subband during any given subframe. The method comprises generating configuration information that indicates a mode according to which the user equipment is to feed back channel state information to the radio network node. According to the indicated mode, in a subframe where channel quality indicator, CQI, is reported, the user equipment shall report one wideband CQI value which is calculated assuming transmission on the subband within which the user equipment is configured to operate in that subframe. The method further comprises configuring the user equipment to feed back channel state information according to the indicated mode by transmitting the configuration information to the user equipment.

Embodiments moreover include a method implemented by a user equipment served by a radio network node, wherein the radio network node is configured to operate within a system bandwidth comprising multiple subbands, wherein the user equipment is limited to operating within only one subband during any given subframe. The method comprises receiving from the radio network node configuration information that indicates a mode according to which the user equipment is to feed back channel state information to the radio network node. According to the indicated mode, in a subframe where channel quality indicator, CQI, is reported, the user equipment shall report one wideband CQI value which is calculated assuming transmission on the subband within which the user equipment is configured to operate in that subframe. The method also comprises configuring the user equipment to feed back channel state information according to the indicated mode.

Embodiments also include corresponding apparatus, computer programs, and carriers.

BRIEF DESCRIPTION OF THE DRAWINGS

FIG. 6 is a table of CQI values according to some embodiments.

FIG. 12 is a table of PUSCH CQI reporting modes according to some embodiments.

FIG. 13 is a table of PUCCH CQI reporting modes according to some embodiments.

DETAILED DESCRIPTION

Figure 1:
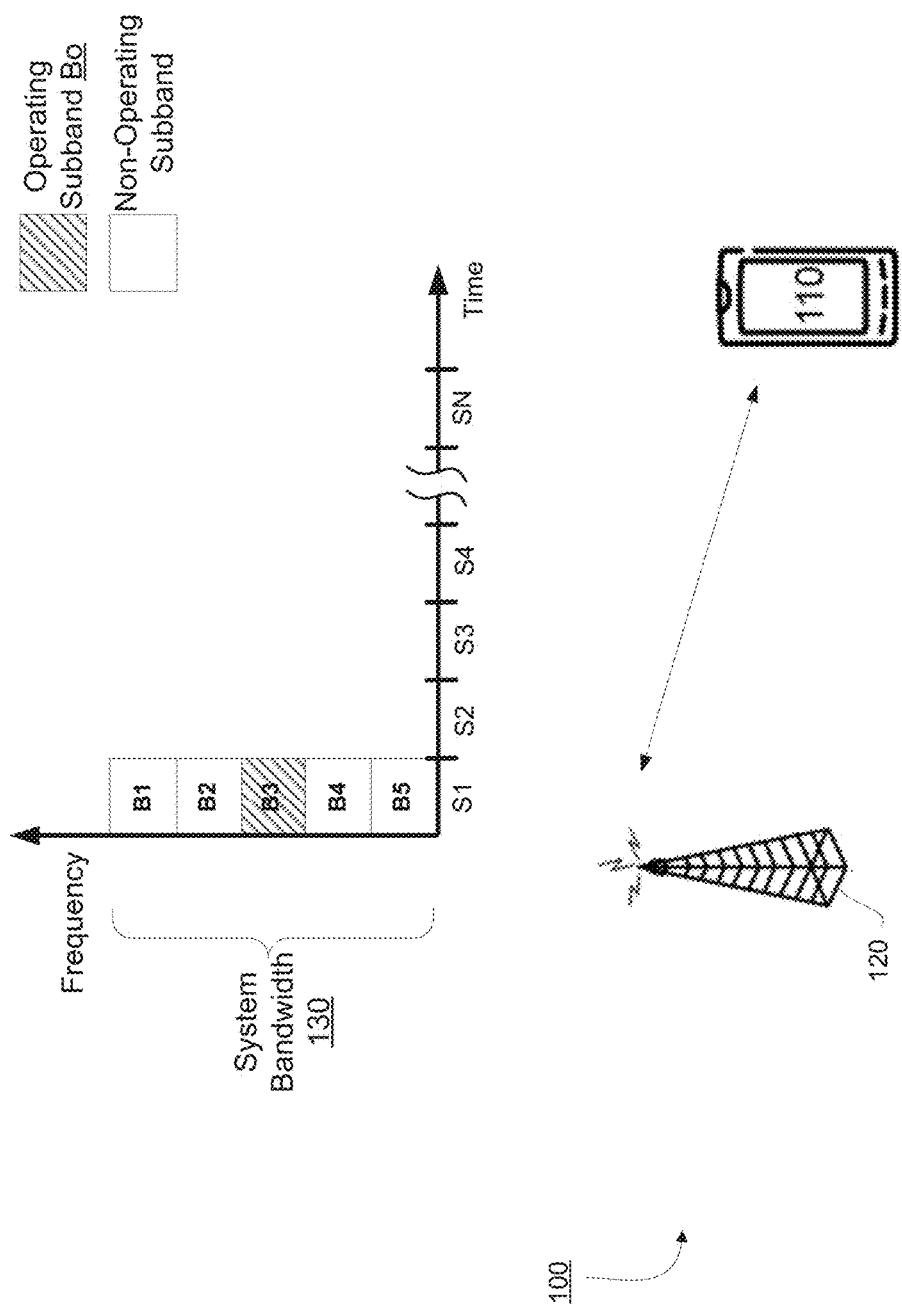
FIG. 1 is a block diagram of a wireless communication system according to one or more embodiments.

FIG. 1 depicts an exemplifying wireless communication system 100 in which embodiments herein may be implemented. The wireless communication system 100 may be for instance a Long Term Evolution (LTE) network. Regardless, the wireless communication system 100 comprises a user equipment (UE) 110, i.e., the user equipment 110 is present in the wireless communication system 100. FIG. 1 also shows that the system 10 comprises a radio network node 120. In some examples, the user equipment 110 is served by the radio network node 120. For example, the radio network node 120 may operate a cell (not shown), in which the user equipment 110 may be located.

The radio network node 120 may be configured to provide or operate within a system bandwidth 130. This system bandwidth 130 may include multiple subbands B1 . . . BX, five of which are shown for example as subbands B1-B5. In some LTE-based embodiments, for instance, each subband B comprises six (6) consecutive physical resource blocks (PRBs) in the frequency domain, i.e., a "6-PRB group" as used herein.

The user equipment 110 is limited to operating within only one subband of the system bandwidth 130 at any given time instance, e.g., during any given radio frame, transmission time interval (TTI), subframe, or the like. That is, at any time at which the user equipment 110 operates (e.g., is scheduled, ordered to somehow be active, etc.), the user equipment 110 only operates within one subband. The user equipment 110 is therefore not operable at two or more subbands B simultaneously at any given time. The one subband in which the user equipment 110 operates at a particular time is referred to for convenience as subband Bo.

In some embodiments, as shown for example in FIG. 1, the system 100 structures the time domain into different subframes S1 . . . SN, such that the user equipment 110 is limited to operating within only one subband Bo during any given subframe Sn. This means that the user equipment 110 is so limited during every subframe Sn in which the user equipment 110 operates, irrespective of when that subframe Sn occurs. Given this limitation on the user equipment 110, the user equipment 110 may also be referred to as a Low Complexity/Enhanced Coverage (LC/EC) UE or a Machine Type Communication (MTC) UE, e.g., Release 13 MTC UE.

In some embodiments, the radio network node 120 chooses the location of the subband Bo at which the user equipment is to be operated at any given time, e.g., for performing channel state information estimation, receiving data, transmitting data, etc. FIG. 1 shows for example that the radio network node 120 controls the user equipment 110 to operate exclusively within subband B3 during subframe S1, i.e., the user equipment's operating subband Bo during subframe S1 is subband B3.

Figure 2:
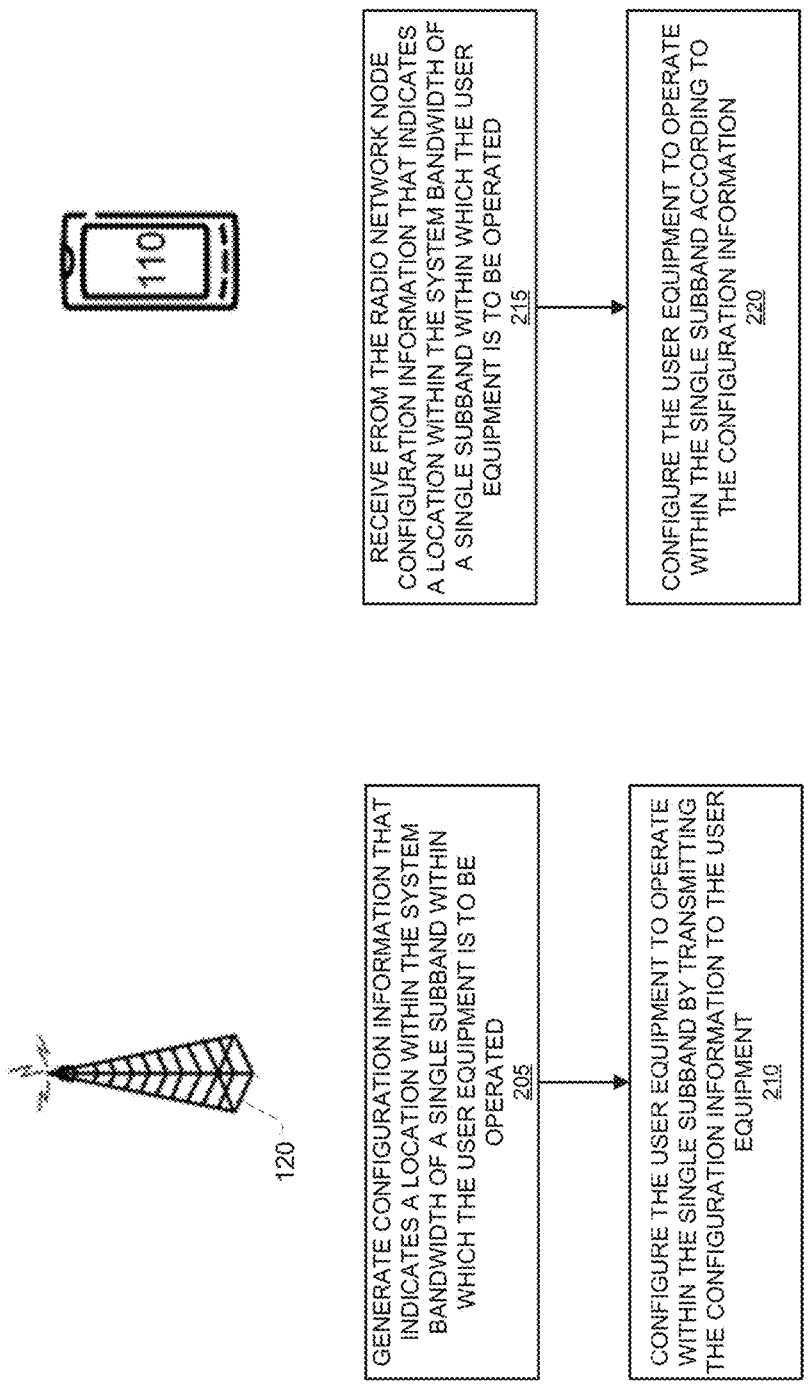
FIGS. 2A-2B are logic flow diagrams of methods respectively performed by a radio network node and a user equipment according to one or more embodiments.

FIGS. 2A-2B illustrate example processing performed by the radio network node 120 and user equipment 110 according to one or more such embodiments. As shown, processing at the radio network node 120 entails generating configuration information that indicates a location within the system bandwidth 130 of a single subband Bo within which the user equipment 110 is to be operated during a subframe Sx (Block 205). Processing further includes configuring the user equipment 110 to operate within the single subband Bo during that subframe Sx by transmitting the configuration information to the user equipment 110 (Block 210), e.g., in a higher-layer message such as a radio resource control (RRC) message.

Corresponding processing at the user equipment 110 entails receiving from the radio network node 120 configuration information that indicates a location within the system bandwidth 130 of a single subband Bo within which the user equipment 110 is to be operated during a subframe Sx (Block 215). Processing further includes configuring the user equipment 110 to operate within the single subband Bo during that subframe Sx according to the configuration information (Block 220).

In some embodiments, the configuration information indicates a location within the system bandwidth 130 of a single subband Bo within which the user equipment 110 is to be operated during any given subframe Sx. That is, the configuration information is essentially subframe agnostic, at least in the sense that the configuration information does not specify to which particular subframe(s) the configuration information applies. Rather, the configuration information may be understood to apply to all future subframes unless and until other configuration information is received. This means that the configuration information need only specify one subband location, as being applicable for any subframe. According to this approach, therefore, the radio network node 120 may send configuration information from time to time (e.g., semi-statically) in order to notify the user equipment 110 about the single subband to use next.

Figure 3:
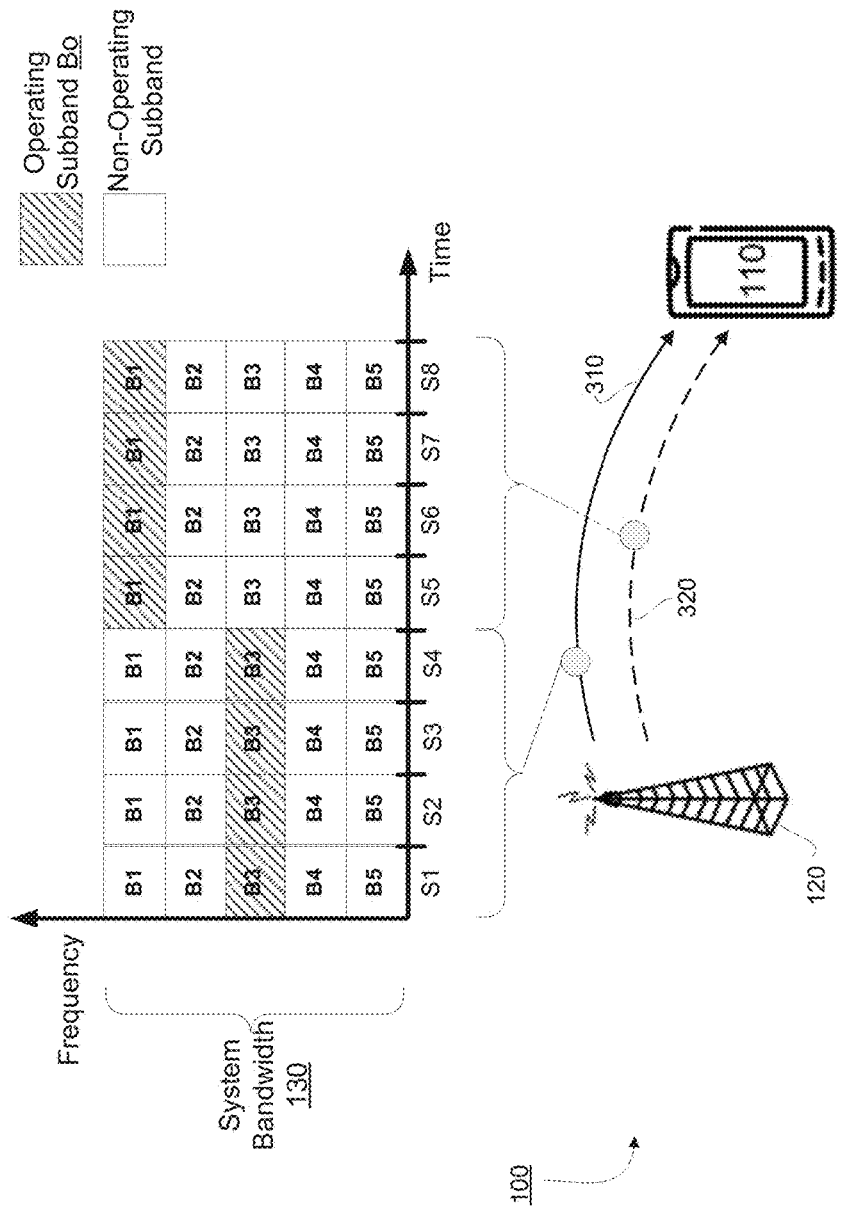
FIG. 3 is a block diagram of a wireless communication system with certain configuration information generated according to one or more embodiments.

FIG. 3 illustrates one example. As shown, the radio network node 120 first generates and sends configuration information 310 indicating that the user equipment 110 is to be operated within subband B3 during any given subframe. The configuration information 310 may for instance specify one subband location B3, as being applicable for any subframe. Accordingly, if the user equipment 110 operates at all within a subframe, the user equipment 110 operates within subband B3 during that subframe, no matter the particular subframe. FIG. 3 thereby shows the user equipment 110 operating within subband B3 during each of subframes S1-S4. The user equipment 110 does so at least unless and until other configuration information 320 indicating the contrary is later received. At some time later, for example, the radio network node 120 in FIG. 3 generates and sends configuration information 320 indicating that the user equipment 110 is to be operated within subband B1 during any given subframe. The user equipment 110 therefore switches from operating within subband B3 to operating within subband B1. FIG. 3 accordingly shows the user equipment 110 switching to operating within subband B1 during each of subframes S5-S8.

As one example in the context of LTE, the radio network node 120 may choose the next 6-PRB group for the user equipment 110 and signal it using higher-layer signaling, e.g., in a Radio Resource Control (RRC) message. The choice of 6-PRB group location is up to the radio network node 120. In order to introduce diversity in the time domain, the radio network node 120 can change the frequency-domain location of the 6-PRB group as time progresses. When change is needed, the radio network node 120 sends a (re-)configuration message to notify the new 6-PRB group to use next. In this case, the RRC message comprises the location of one 6-PRB group. This may thus mean that the radio network node 120 sends, in action 210, configuration information indicating a location within an operating bandwidth of the radio network node 120, wherein the location specifies where within the operating bandwidth the user equipment 110 is to be operated.

In other embodiments, the configuration information indicates, for each of different subframes, a location within the system bandwidth 130 of a single subband Bo within which the user equipment 110 is to be operated during that subframe (where "that" subframe here refers to the respective one of the different subframes). In this way, the configuration information may configure the user equipment 110 to operate in different subbands in different respective subframes. The user equipment 110 may therefore re-tune to a different subband from time to time in different subframes, e.g., on a subframe by subframe or subframe group by subframe group basis.

In one such embodiment, for example, the configuration information indicates a hopping pattern according to which the location of the single subband periodically varies every certain number of subframes. This number of subframes may be defined for instance as $N_{abs}^{EPDCCH}$ subframes in LTE-based embodiments. Regardless, the number of subframes may be predefined or indicated by the configuration information. In at least some embodiments, the pattern is specific to a cell served by the radio network node 120. In such a case, therefore, the pattern may be broadcast cell wide.

Figure 4:
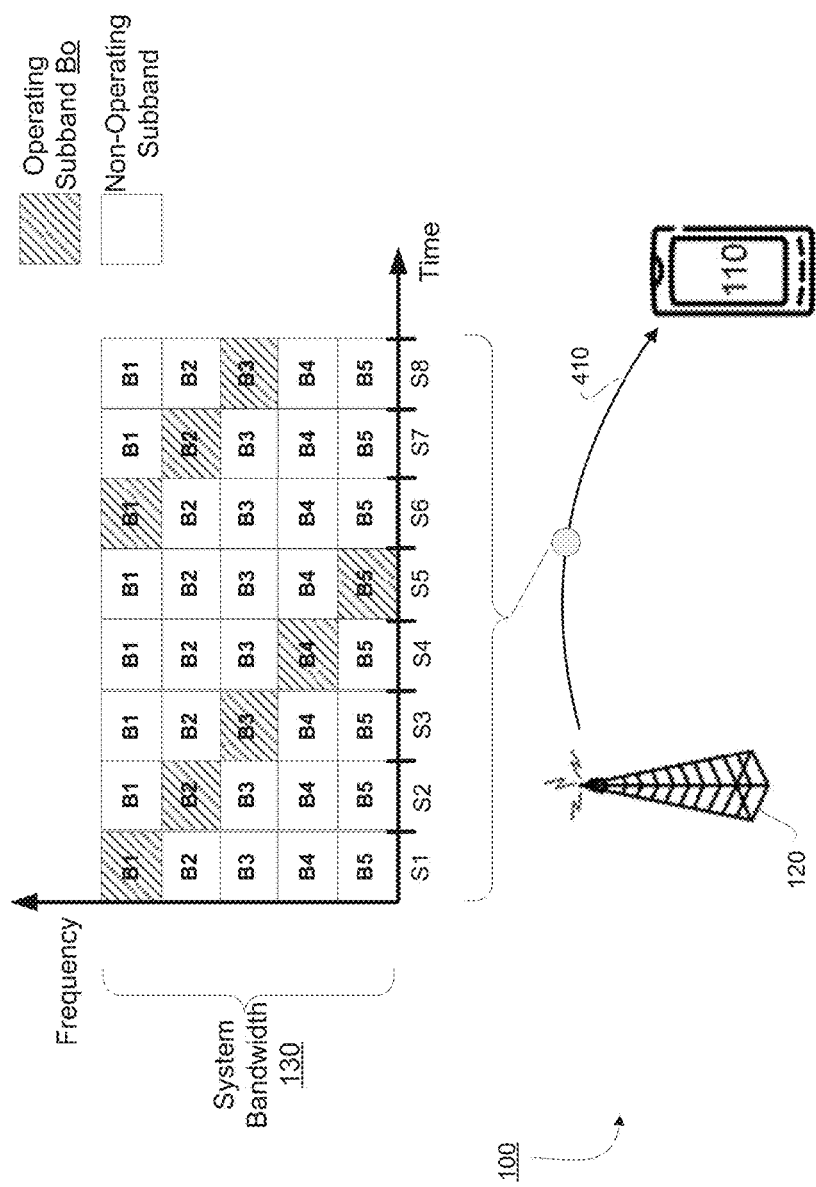
FIG. 4 is a block diagram of a wireless communication system with certain configuration information generated according to one or more other embodiments.

FIG. 4 illustrates one example where the configuration information indicates a hopping pattern where the subband location periodically varies every subframe. According to the pattern shown, the operating subband Bo is subband B1 during subframe S1, but hops to subband B2 during subframe S2. The operating subband Bo next hops to subband B3 during subframe S3, then to subband B4 during subframe S4 and subband B5 during subframe S5. This pattern then repeats for subsequent subframes S6 and on.

As one example in the context of LTE, the radio network node 120 sends configuration information that configures the user equipment 110 to semi-statically retune to a different 6-PRB group periodically every $T_{hop}$ subframes. The location of the 6-PRB group varies according to a pattern. The pattern can be predefined or configurable. The pattern can be specific to the user equipment of concern (hence sent to the UE in a unicast manner), or shared by a group of UEs (hence sent to the group of UEs in a multicast manner), or shared by all UEs (hence predefined to be known to all UEs and do not need to be sent, or sent in a cell wide broadcast manner). The configuration may be via higher signaling from eNB (if needed to be sent), such as an RRC message. In this case the RRC message contains information on: (a) the periodicity of $T_{hop}$ subframes; (b) the set of locations of the 6-PRB group that the UE may move to sequentially. Accordingly, the radio network node 120 may send configuration information indicating a periodicity of subframes, at which the UE is to operate at a certain subband, i.e. 6-PRB group, and/or a pattern according to which the 6-PRB group for the UE changes its location.

Note that the user equipment 110 may be configured for any sort of operation within an indicated operating subband Bo according to the configuration information. In some embodiments, for example, the user equipment 110 is configured for operating in an indicated subband Bo in the sense that the user equipment is configured to transmit data in the uplink towards the radio network node 120 within that subband Bo. Alternatively or additionally, the user equipment 110 may be configured to receive data in the downlink from the radio network node 120 within the subband Bo. Still further, the user equipment 110 may be configured to perform channel state information (CSI) estimation on one or more signals received from the radio network node 120 within the subband Bo.

In this latter CSI case, the user equipment 110 performs CSI estimation on the indicated subband Bo. The user equipment 110 may report this CSI with reference to the subband Bo. For example, where the subband Bo is a 6-PRB group, the CSI reference resource for a serving cell in the frequency domain may be defined by the 6-PRB group of downlink physical resource blocks corresponding to the band where the user equipment 110 is configured to operate. The CSI reference resource is used by the user equipment 110 to generate channel state information (such as CQI, PMI).

In combination with any of the above embodiments, or separately, the radio network node 120 in some embodiments generates configuration information to manage, control, or otherwise configure CSI reporting by the user equipment 110. The configuration information in this regard may indicate a mode according to which the user equipment 110 is to feed back CSI to the radio network node 120. This configuration information may be the same configuration information as that described above for indicating a location within the system bandwidth of a single subband within which the user equipment 110 is to be operated during a subframe, i.e., the configuration information indicates both a subband location and a CSI feedback reporting mode. Alternatively, the subband location and CSI feedback reporting mode may be indicated in different configuration information. In any event, this CSI feedback reporting mode in some embodiments is specifically applicable to a type of user equipment that is limited to operating within only one subband during any given subframe.

Figure 5:
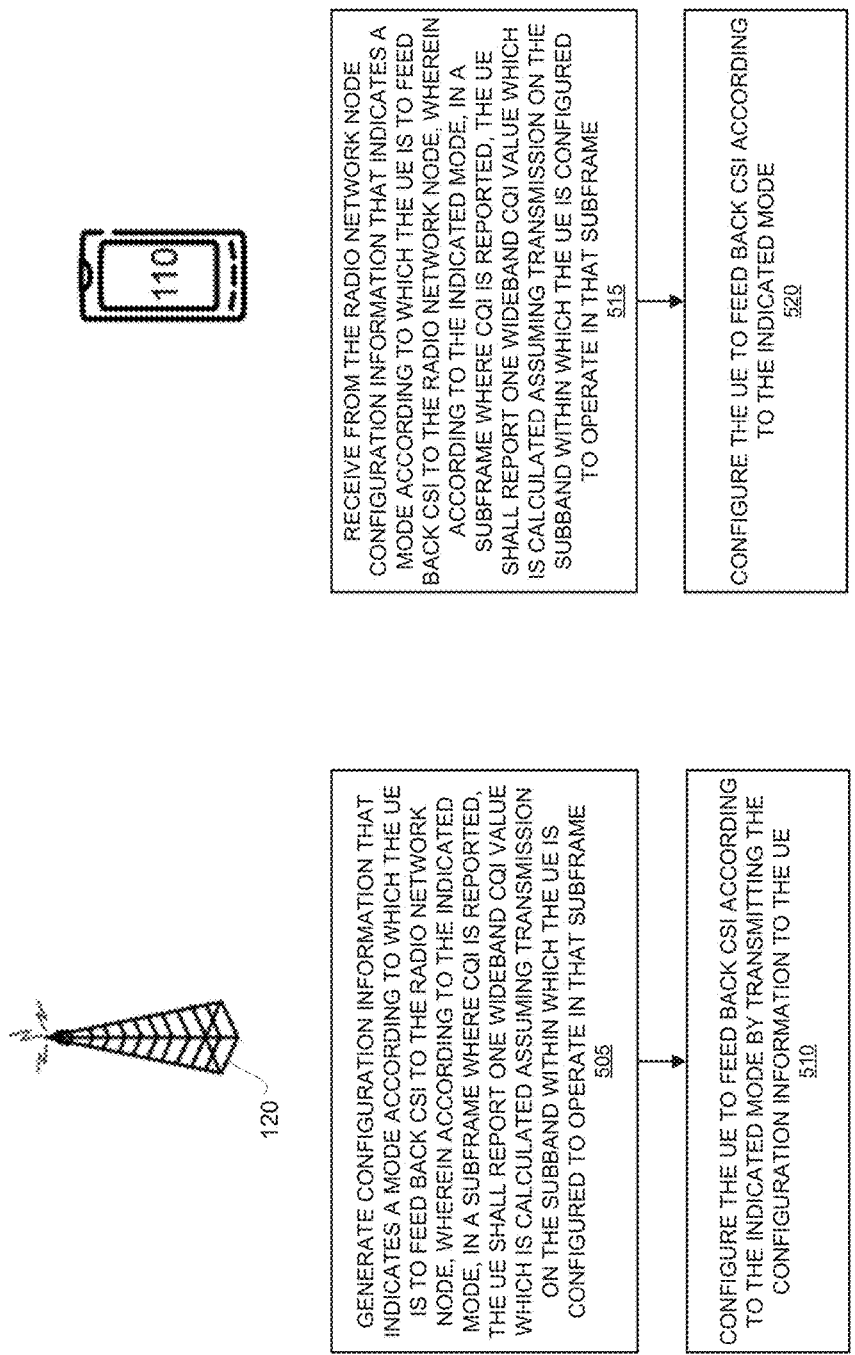
FIGS. 5A-5B are logic flow diagrams of methods respectively performed by a radio network node and a user equipment according to one or more other embodiments.

In at least some embodiments, indicating this mode effectively indicates to the user equipment 110 whether and/or how it is to report wideband CQI to the radio network node 120. FIGS. 5A-5B illustrate processing performed by the radio network node 120 and user equipment 110 according to one or more of these embodiments.

As shown in FIG. 5A, processing at the radio network node 120 entails generating configuration information that indicates a mode according to which the user equipment 110 is to feed back CSI to the radio network node 120 (Block 205). According to the indicated mode, in a subframe where CQI is reported, the user equipment 110 shall report one wideband CQI value which is calculated assuming transmission on the subband Bo within which the user equipment 110 is configured to operate in that subframe. Processing further includes configuring the user equipment 110 to feed back CSI according to the indicated mode by transmitting the configuration information to the user equipment 110 (Block 510), e.g., in a higher-layer message such as a radio resource control (RRC) message.

Corresponding processing at the user equipment 110 entails receiving from the radio network node 120 configuration information that indicates a mode according to which the user equipment 110 is to feed back CSI to the radio network node 120 (Block 515). Again, according to the indicated mode, in a subframe where CQI is reported, the user equipment 110 shall report one wideband CQI value which is calculated assuming transmission on the subband Bo within which the user equipment 110 is configured to operate in that subframe (Block 520).

In some embodiments, therefore, wideband CQI at least in the indicated mode is defined as reflecting the channel quality across only one subband of the system bandwidth 130, rather than as reflecting the channel quality across the entire system bandwidth 130. From another perspective, wideband CQI according to some embodiments herein constitutes an increased CQI reporting granularity in that the frequency granularity over which the CQI report pertains is increased, e.g., particularly when reported for multiple different subbands. This meaning of wideband CQI may be specific for a certain type of UEs (e.g., LC/CE UEs).

In the context of LTE, for example, the CQI contains information to indicate a suitable downlink transmission data rate, i.e., a Modulation and Coding Scheme (MCS) value. See for instance FIG. 6 in this regard. CQI is a 4-bit integer and is based on the observed signal-to-interference-plus-noise ratio (SINR) at the user equipment 110. The CQI estimation process may take into account the user equipment's capability such as the number of antennas and the type of receiver used for detection. Indeed, for the same SINR value, the MCS level that can be supported by a user equipment depends on these various UE capabilities, which needs to be taken into account in order for the radio network node 120 to select an optimum or suitable MCS level for the transmission. The reported CQI values may be used by the radio network node 120 for downlink scheduling and link adaptation.

A wideband CQI value in this context may be one CQI value for an entire subband Bo. This value may be for instance a 4-bit integer that represents an effective SINR as observed by the user equipment 110 over the subband Bo within which it is configured to operate (for performing CSI measurement). With this wideband CQI, the variation in the SINR across the subband due to any frequency selectivity is masked out. Therefore, frequency selective scheduling where the user equipment 110 is placed only in resource blocks with high SINR is not possible from a wideband CQI value alone.

Against this backdrop, in embodiments where a subband Bo constitutes a 6-PRB group, a wideband CQI may be defined to be a CQI value calculated assuming transmission on the configured 6-PRB group. This may be for instance a UE-specific 6-PRB group (or 6-PRB band segment) which is assigned to the user equipment 110. This may mean that the radio network node 120 sends configuration information indicating that wideband CQI values are redefined to be a respective CQI value, calculated while assuming transmission only on the specific 6-PRB group (or subband) assigned to the user equipment 110. Note that here multiple UEs may share the same UE-specific 6-PRB group, with each UE configured in a UE-specific manner.

Alternatively, a wideband CQI may be defined to be a CQI value calculated assuming transmission only on a predefined 6-PRB group, shared by all UEs (e.g., all LC/CE UEs). For example, the wideband CQI may be evaluated assuming transmission on a default 6-PRB group known to all MTC UEs. This default 6-PRB group may be, for example, the 6-PRB group located at the center of the system bandwidth, over which the Master Information Block (MIB), Primary Synchronization Signal (PSS) and Secondary Synchronization Signal (SSS) are transmitted. This example may be seen as a special case of the preceding example in that the 6-PRB group is configured, statically or semi-statically, to a common 6-PRB group shared by all LC/CE UEs served by the radio network node 120. In the preceding example, the common 6-PRB group refers to the 6-PRB group assigned, e.g. during configuration, to the UE.

In the two latter examples above, the wideband CQI is defined to refer to a CQI value of the 6-PRB subband at which the user equipment 110 operates. It is noted that this may be seen as equivalent to adding new subband CQI granularity of 6 PRBs for all system bandwidth. For example, for existing system bandwidth of 64-110 PRBs, the subband granularity is 8 PRB, which is not usable by LC/CE UEs. The redefined wideband CQI described above essentially adds a 6-PRB granularity for the operation of LC/CE UEs within a network with system bandwidth of 64-110 PRBs.

In any event, the mode indicated by the configuration information of FIGS. 5A-5B may in some embodiments simplify CSI reporting, e.g., as compared to conventional LTE approaches. For example, according to the indicated mode the user equipment 110 in some embodiments shall calculate the wideband CQI value (and any other CSI, e.g., PMI) conditioned on a transmission rank of one. In some embodiments, for example, the user equipment 110 has or is assumed to have a single receiving antenna; that is, the transmission rank is always one (1). With only a single transmission rank possible, the user equipment 110 shall not transmit a transmission rank indicator as part of the channel state information. Refraining from signaling the transmission rank of course saves signaling bandwidth.

Similarly, CSI reporting is simplified in some embodiments by the wideband CQI value representing channel quality for only a single codeword. In one embodiment, for instance, only a single codeword is possible for the user equipment 110, meaning that a second PMI need not be fed back. In fact, at most one PMI needs to be reported, corresponding to one codeword.

In any event, according to the mode indicated by the configuration information of FIGS. 5A-5B, the user equipment 110 in some embodiments shall periodically feed back CSI to the radio network node 120, e.g., using the Physical Uplink Control Channel (PUCCH) in LTE. In one such embodiment, the CSI that the user equipment 110 is to feed back includes the wideband CQI value, but not a precoding matrix indicator (PMI). In an LTE context, for example, the indicated mode may correspond to PUCCH CSI reporting mode 1-0, e.g., as shown in Table 7.2.1-1 of TS 36.213. This type of mode without PMI reporting reduces signaling overhead, e.g., particularly in low bandwidth systems such as MTC systems.

Alternatively, the CSI that the user equipment 110 is to periodically feed back includes a single (PMI) in addition to the wideband CQI. According to such an embodiment, in the subframe where CQI and PMI are reported (e.g., for all transmission modes), a single precoding matrix is selected from a codebook subset assuming transmission on the subband Bo within which the user equipment 110 is configured to operate in that subframe. In one embodiment, for example, in order to report CSI within a particular subframe, the user equipment 110 selects a single precoding matrix assuming transmission on the subband Bo within which the user equipment 110 is configured to operate in that subframe. The user equipment 110 may report an indicator for the single selected precoding matrix in the subframe. In an LTE context, the indicated mode in this instance may correspond to PUCCH CSI reporting mode 1-1. This type of mode also reduces signaling as compared to conventional approaches, because PMI is only reported for one codeword.

Simplifying CSI reporting in this way (e.g., without a rank indicator and/or a second PMI) may mean that certain reporting resources or instances are left unconsumed. For the subframes where a normal UE needs to send a periodic CSI report, but the CSI report content is not applicable to LC/CE UEs (e.g., RI or second PMI), the reporting instances are simply skipped (i.e., the UE does not transmit PUCCH for carrying the periodic CSI). That is, in some embodiments, different types of CSI content are reported with different periodicities, meaning that at different CSI reporting instances different CSI content may be reported. For example, CQI may be reported every 5 subframes with offset 0 and RI may be reported every 10 ms with offset 1. Where the user equipment 110 only needs to report CQI and/or a first layer PMI, the user equipment 110 may transmit CSI at a fewer number of CSI reporting instances as compared to other UEs that may need to also report a rank indicator and/or a second PMI.

Also note that, for simplicity and reduced signaling load, only a limited number of periodic CSI reporting modes may be allowed for certain types of UEs (e.g., LC/CE UEs). The user equipment 110 herein therefore may be of a type for which only two modes are supported for periodically reporting CSI. These two modes may be the two periodic CSI reporting modes just described. For example, only wideband CQI modes 1-0 and 1-1 may be allowed in an LTE context. Further, reporting opportunities in time may be reduced to reduce signaling load.

Of course, some embodiments herein recognize that periodic CSI reporting is expensive and perhaps unnecessary in certain contexts. For example, for Rel-13 MTC UE in enhanced coverage, periodic CSI reporting by PUCCH is expensive due to the large number of repetitions required for PUCCH reception. Periodic CSI reporting may be unnecessary since a MTC UE only have sporadic UL transmission. In these and other scenarios, therefore, the user equipment 110 may be of a type that does not support periodic CSI reporting.

In still further embodiments, according to the mode indicated by the configuration information of FIGS. 5A-5B, the user equipment 110 shall aperiodically feed back CSI to the radio network node 120, e.g., using the Physical Uplink Shared Channel (PUSCH) in LTE. This feedback may for instance be triggered by a scheduling grant, i.e. the user equipment 110 receives a scheduling grant which determines that the user equipment 110 may send an aperiodic CSI report according to its current configuration.

Similar to the above for periodic CSI reporting, the CSI that the user equipment 110 is to feed back in some embodiments includes the wideband CQI value, but not a precoding matrix indicator (PMI). In an LTE context, for example, the indicated mode may correspond to PUSCH CSI reporting mode 2-0, e.g., as shown in Table 7.2.1-1 of TS 36.213. This type of mode without PMI reporting reduces signaling overhead, e.g., particularly in low bandwidth systems such as MTC systems.

Again note that, for simplicity and reduced signaling load, only a limited number or subset of aperiodic CSI reporting modes may be allowed for certain types of UEs. The user equipment 110 herein therefore may be of a type (e.g., LC/CE) for which only one mode is supported for aperiodically reporting CSI. This one mode may be the aperiodic CSI reporting mode just described. For example, only UE-selected mode 2-0 or wideband CQI mode 1-2 may be allowed in an LTE context. Further, it is possible that the modes above described are further simplified such that only a subset of described CSI fields is allowed, so as to reduce signaling load. For example, Mode 1-2 and Mode 2-2 may be modified such that only a single PMI is reported, where the PMI is the selected single precoding matrix indicator for the configured 6-PRB group.

It shall be understood that the CSI reporting modes (e.g., PUSCH CSI reporting modes as well as the PUCCH CSI reporting modes) may be predefined in a standard specification. Alternatively or additionally, the reporting modes may be communicated from the radio network node 120 to the user equipment 110 in order to set up a common understanding, among the radio network node 120 and the user equipment 110, concerning which mode maps to which value(s). When such common understanding has been achieved, the radio network node 120 may send one or more of the values relating to the modes as part of the configuration information described above.

Note also that one or more embodiments herein exploit wideband CQI to differentially encode one or more other CQI values reported from the user equipment 110 to the radio network node 120. That is, according to the indicated mode in some embodiments, the user equipment 110 shall report at least one differential CQI value that is encoded differentially relative to the wideband CQI value. This differential encoding may better conserve signaling resources. For example, the wideband CQI value may be encoded using 4 bits, whereas differential CQI values may only consume 2 bits due to differential encoding.

In still other embodiments, wideband CQI is excluded from CSI reporting. For example, in some embodiments, the user equipment 110 is not able to receive a power-controlled control channel from the radio network node 120 because the user equipment 110 is not able to receive over the whole system bandwidth 130. This control channel would typically have its power level set based on wideband CQI. Since one of the benefits of wideband CQI is not realizable for the user equipment 110 (or any LC/CE UE), these embodiments dispense with the wideband CQI altogether. Excluding wideband CQI may reduce signaling overhead in some cases. That said, excluding wideband CQI means that any other CQI values are not able to be differentially encoded relative to that wideband CQI. Each of these other CQI values would have to be encoded as an absolute value (e.g., of 4 bits rather than only 2). In any case, though, the radio network node 120 in these embodiments may send configuration information indicating that wideband CQI is to be excluded from CSI reporting. Correspondingly, the user equipment 110 is configured to provide CSI reports that lack wideband CQI.

Yet other embodiments herein alternatively or additionally define a CSI reporting mode in which the user equipment 110 reports CQI for a so-called sub-subband. A sub-subband as used herein refers to a subset or portion of a subband. For example, where a subband is six (6) consecutive PRBs (i.e., a 6-PRB group), a sub-subband may comprise a fraction of any given 6-PRB group, i.e., one or more PRBs within any given 6-PRB group.

The size of a sub-subband may be predefined (e.g., to be 1, 2, or 3 PRBs). In one embodiment, the sub-subband sizes are equal and span the configured subband. In special cases, the subband may be divided into e.g. two or three unequal portions. Such dividing may preferably be predefined. For example, a subband comprising a 6-PRB group may be divided into a first portion of 2 PRBs and a second portion of 4 PRBs. As a further example, the 6-PRB group may be divided such that the first portion is 1 PRB, the second portion is 2 PRBs and a third portion is 3 PRBs.

The location of the sub-subband for CSI report can be either higher-layer signaled from the radio network node 120 or selected by the user equipment 110 itself.

Regardless, CQI for a sub-subband may be referred to as a sub-subband CQI. Sub-subband CQI may be reported for instance in place of or as a redefinition of conventional subband CQI. Sub-subband CQI may therefore be reported in certain reporting mode(s), such as for instance PUSCH CSI reporting mode 2-0, 2-2, 3-0, 3-1, or 3-2 and/or PUCCH CSI reporting mode 2-0 or 2-1 in LTE.

As an example, different modes for periodic CSI reporting (e.g., for LTE-based embodiments) may be defined as follows, to the extent that the modes are supported at least. That is, any or all of the below modes may be supported; if a mode is supported, it may be defined as indicated below.

Consider for instance potential wideband feedback modes for periodic CSI reporting. In Mode 1-0, in the subframe where CQI is reported, a UE shall report one wideband CQI value which is calculated assuming transmission on the configured 6-PRB group. The wideband CQI represents channel quality for a single codeword.

In mode 1-1, in the subframe where CQI/PMI is reported for all transmission modes, a single precoding matrix is selected from the codebook subset assuming transmission on the configured 6-PRB group. A UE shall report a single wideband CQI value which is calculated assuming the use of a single precoding matrix in all sub-subbands and transmission on the configured 6-PRB group. The UE shall also report the selected single PMI (wideband PMI). The PMI and CQI are calculated conditioned on transmission rank 1. The UE may perform the above described selection and/or calculation in the subframe where CQI/PMI is reported for all transmission modes, or may perform the selection and/or calculation in advance of that subframe.

Accordingly, in at least some embodiments, a UE selects a single precoding matrix assuming transmission on the configured 6-PRB group. In order to generate a CSI report for reporting in a particular subframe (i.e., a subframe where CQI/PMI is reported for all transmission modes), the UE determines a single precoding matrix indicator (PMI) corresponding to the single selected precoding matrix. The UE also determines a single wideband CQI value which is calculated assuming the use of the selected matrix in all subbands and transmission on the configured 6-PRB group. The single PMI and wideband CQI are calculated conditioned on transmission rank 1. The UE reports the single PMI and wideband CQI in the particular subframe.

Next consider potential UE Selected subband feedback reporting modes for periodic CSI reporting. For the UE-selected subband CQI, a CQI report in a certain subframe of a certain serving cell describes the channel quality in a particular part or in particular parts of the bandwidth of that serving cell described subsequently as bandwidth part (BP) or parts. The bandwidth parts shall be indexed in the order of increasing frequency and non-increasing sizes starting at the lowest frequency.

In mode 2-0, in the subframe where wideband CQI is reported and on each respective successive reporting opportunity, the UE shall report one wideband CQI value which is calculated assuming transmission on the configured 6-PRB group. The wideband CQI represents channel quality for a single codeword. In the subframe where CQI for the selected subbands is reported, the UE shall select the preferred sub-subband within the set of Nj sub-subbands. Here the number of bandwidth parts is set to J=1. The sub-subband size is predefined. The size can be either 1, or 2, or 3 PRBs. The UE shall report one CQI value reflecting transmission only over the selected sub-subband of the configured 6-PRB group. The CQI represents channel quality for a single codeword.

In mode 2-1, in the subframe where wideband CQI/PMI is reported, a single precoding matrix is selected from the codebook subset assuming transmission on the configured 6-PRB group. On each respective successive reporting opportunity, a UE shall report a wideband CQI value which is calculated assuming the use of a single precoding matrix in all sub-subbands and transmission on the configured 6-PRB group. The UE shall also report the selected single PMI (wideband PMI). Again, the PMI and CQI values are calculated conditioned on transmission rank 1.

Furthermore, in the subframe where CQI for the selected subband is reported, the UE shall select the preferred sub-subband within the set of Nj subbands in the configured 6-PRB group. Here the number of bandwidth parts set to J=1. The sub-subband size is predefined. The size can be either 1, or 2, or 3 PRBs. On each respective successive reporting opportunity, the UE shall report a CQI value for a single codeword reflecting transmission only over the selected sub-subband in the previous step along with the corresponding preferred subband L-bit label (e.g., an L-bit label indicating the preferred subband). The subband selection and CQI values are calculated conditioned on the last reported PMI and transmission rank 1.

The UE may perform the above described selection and/or calculation in the subframe where CQI/PMI is reported, or may perform the selection and/or calculation in advance of that subframe.

Accordingly, in at least some embodiments, a UE selects a single precoding matrix assuming transmission on the configured 6-PRB group. In order to generate a CSI report for reporting in a particular subframe (i.e., a subframe where CQI/PMI is reported), the UE determines a single precoding matrix indicator (PMI) corresponding to the single selected precoding matrix. The UE also determines a single wideband CQI value which is calculated assuming the use of the selected matrix in all subbands and transmission on the configured 6-PRB group. The single PMI and wideband CQI are calculated conditioned on transmission rank 1. The UE also selects the preferred subband within the set of Nj subbands in the configured 6-PRB group. Here the number of bandwidth parts is set to J=1. The sub-subband size is predefined. The size can be either 1, or 2, or 3 PRBs. The UE determines a CQI value for a single codeword reflecting transmission only over the selected subband. The UE also determines a label (e.g., of L bits) indicating the selected subband. The subband selection and CQI value are conditioned on the last reported PMI and transmission rank 1. In the particular subframe, the UE reports the single PMI and wideband CQI, as well as the label indicating the selected subband and the CQI value determined for that selected subband.

Consider now aperiodic CSI reporting modes. For wideband feedback mode 1-2, for each sub-subband, a preferred precoding matrix is selected from the codebook subset assuming transmission only in the sub-subband. A UE shall report one wideband CQI value for a single codeword which is calculated assuming the use of the corresponding selected precoding matrix in each sub-subband and transmission on the configured 6-PRB group. The UE shall report the selected precoding matrix indicator (e.g., corresponding to the precoding matrix selected as preferred) for each sub-subband. The reported PMI and CQI values are calculated conditioned on rank 1.

Higher Layer-configured subband feedback modes for aperiodic CSI reporting modes may also be supported. If mode 3-0 is supported, for instance, a UE shall report a wideband CQI value which is calculated assuming transmission on the 6-PRB group assigned to the LC/EC UE. The UE shall also report one subband CQI value for each sub-subband. The subband CQI value is calculated assuming transmission only in the sub-subband. Both the wideband and subband CQI represent channel quality for the first codeword, even when RI>1. The reported CQI values are calculated conditioned on rank 1.

In mode 3-1, a single precoding matrix is selected from the codebook subset assuming transmission on the configured 6-PRB group. A UE shall report one subband CQI value for a single codeword for each sub-subband which are calculated assuming the use of the single precoding matrix in all sub-subbands and assuming transmission in the corresponding sub-subband. A UE shall report a wideband CQI value for a single codeword which is calculated assuming the use of the single precoding matrix in all sub-subbands and transmission on the configured 6-PRB group. The UE shall report the selected single precoding matrix indicator (e.g., corresponding to the single precoding matrix that was selected). The reported PMI and CQI values are calculated conditioned on rank 1.

In mode 3-2, for each sub-subband a preferred precoding matrix is selected from the codebook subset assuming transmission only in the sub-subband. A UE shall report one wideband CQI value for a single codeword which is calculated assuming the use of the corresponding selected precoding matrix in each sub-subband and transmission on the configured 6-PRB group. A UE shall report the selected single precoding matrix indicator for each sub-subband. A UE shall report one sub-subband CQI value for a single codeword for each sub-subband reflecting transmission over the sub-subband and using the selected precoding matrix in the corresponding sub-subband. The reported PMI and CQI values are calculated conditioned on rank 1. Subband CQI value for each codeword are encoded differentially with respect to their respective wideband CQI using 2-bits as defined by: subband differential CQI offset level=subband CQI index−wideband CQI index. Supported sub-subband size may be predefined. The size can be either 1, or 2, or 3 PRBs.

In UE-selected subband feedback mode 2-0, the UE shall select a set of M preferred sub-subbands of size k within the configured 6-PRB group. Parameters k and M are predefined. One example is M=1, k=3. Another example is M=1, k=2. The UE shall also report one CQI value reflecting transmission only over the M selected subbands determined in the previous step. The CQI represents channel quality for a single codeword. Additionally, the UE shall also report one wideband CQI value which is calculated assuming transmission on the configured 6-PRB group. The wideband CQI represents channel quality for a single codeword. The reported CQI values are reported conditioned on rank 1.

In mode 2-2, the UE shall perform joint selection of the set of M preferred subbands of size k within the configured 6-PRB group, and a preferred single precoding matrix selected from the codebook subset that is preferred to be used for transmission over the M selected subbands. Parameters k and M are predefined. One example is M=1, k=3. Another example is M=1, k=2. A single precoding matrix is selected from the codebook subset assuming transmission on the configured 6-PRB group. The UE shall report one CQI value for a single codeword reflecting transmission only over the selected M preferred subbands and using the same selected single precoding matrix in each of the M subbands. The UE shall also report an indicator for the single precoding matrix selected as preferred for the M selected subbands. The UE shall furthermore report an indicator for the single precoding matrix selected for (i.e., assuming transmission on) the configured 6-PRB group. A UE shall report a wideband CQI value per codeword which is calculated assuming the use of the single precoding matrix in all subbands and transmission on the configured 6-PRB group.

Some embodiments above have described the user equipment 110 as determining certain CSI (e.g., a wideband CQI and/or precoding matrix) for reporting in a particular subframe. The user equipment 110 may in some embodiments calculate or otherwise determine this CSI within the same subframe that the CSI is to be reported in. However, note that the user equipment 110 may as well, alternatively or additionally, calculate or otherwise determine CSI in one or more subframes prior to the subframe in which that CSI is to be reported. For example, the user equipment 110 may calculate (e.g., average) the wideband CQI over multiple (e.g., consecutive) subframes before reporting the wideband CQI in a particular subframe. Multiple subframes may be used for instance in scenarios where repetitions are used for transmissions to and/or from the user equipment 110.

Figure 7:
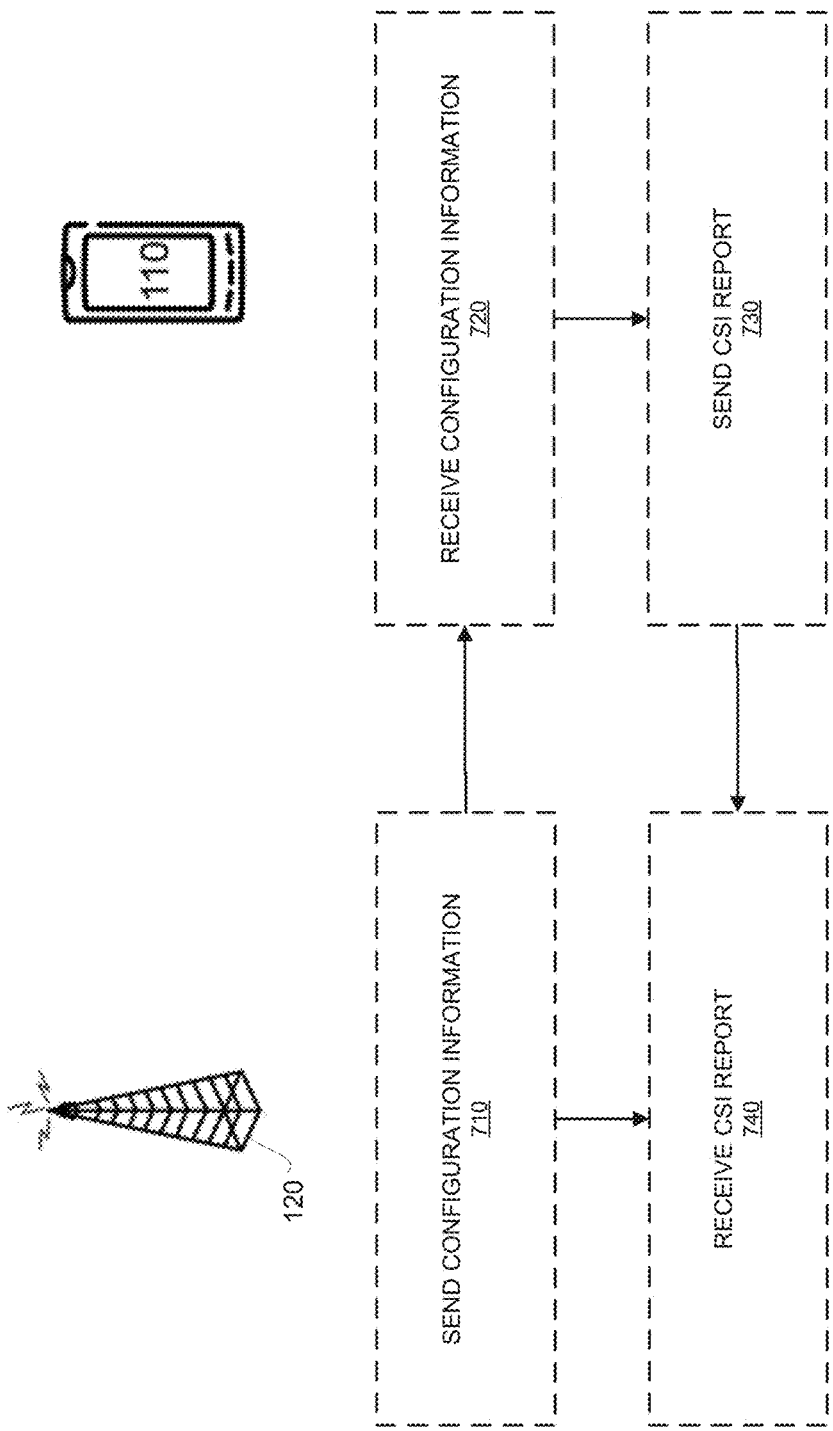
FIG. 7 illustrates logic flow diagrams of methods respectively performed by a radio network node and a user equipment according to still one or more other embodiments.

In view of the above modifications and variations, FIG. 7 illustrates exemplifying methods when implemented in the wireless communication system 100 of FIG. 1. The user equipment 110 may perform a method for managing CSI reporting. The radio network node 120 may perform a method for managing CSI reporting. One or more of the following actions may be performed in any suitable order.

In action 710, the radio network node 110 may send configuration information relating to configuration of CSI reports, e.g. periodic and/or aperiodic CSI reports, to the user equipment 110. Furthermore, periodic and/or aperiodic CSI reports may specify wideband CQI, subband CQI and/or sub-subband CQI to be reported, in action 730, by the user equipment 110.

For example, the configuration information may specify that wideband CQI reporting is to be excluded or that the wideband CQI is redefined to refer to CQI values of the subband at which the user equipment 110 operates. Additionally or alternatively, the subband CQI values may refer to sub-subbands of the subband at which the UE operates. These and other manners of specifying the configuration information are described in more detail herein.

In action 720, the user equipment 110 may receive the configuration information from the radio network node 120. In some examples, the configuration information may be predefined. Then the user equipment 110 obtains the configuration information, e.g. when being provided with software for handling CQI reporting.

In action 730, the user equipment 110 may send, to the radio network node 120, a CSI report, which is configured according to the configuration information. According to one of the examples herein, the CSI report may thus indicate a value relating to CQI of a sub-subband of the subband at which the user equipment 110 operates. According to one other of the examples herein, the CSI report may have a format according to a wideband CQI report, wherein the reported value relates to CQI of the subband at which the user equipment 110 operates.

In action 240, the radio network node 120 may receive the CSI report from the user equipment 110.

Figure 8:
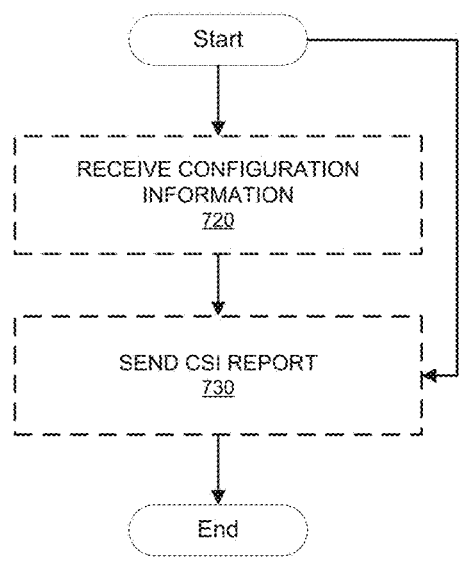
FIG. 8 is a logic flow diagram of a method performed by a user equipment according to some embodiments.

In FIG. 8, an exemplifying, schematic flowchart of a method in the user equipment 110 is shown. The same reference numerals as used in connection with FIG. 7 have been applied to denote the same or similar actions. The actions may be performed in any suitable order.

Figure 9:
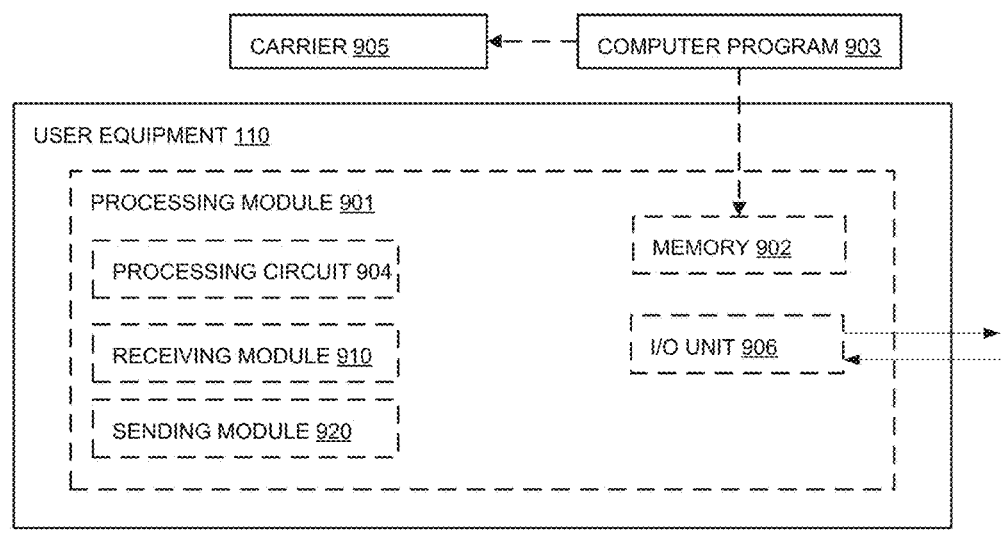
FIG. 9 is a block diagram of a user equipment, computer program, and/or carrier, according to one or more embodiments.

With reference to FIG. 9, a schematic block diagram of the user equipment 110 is shown. The user equipment 110 may comprise a processing module 901, such as a means, one or more hardware modules and/or one or more software modules for performing the methods described herein. The user equipment 110 may further comprise a memory 902. The memory may comprise, such as contain or store, a computer program 903.

According to some embodiments herein, the processing module 901 comprises, e.g. 'is embodied in the form of' or 'realized by', a processing circuit 904 as an exemplifying hardware module. In these embodiments, the memory 902 may comprise the computer program 903, comprising computer readable code units executable by the processing circuit 904, whereby the user equipment 110 is operative to perform the methods of e.g. FIGS. 2B, 5B, 7, and/or 8.

FIG. 9 further illustrates a carrier 905, that may comprise the computer program 903 described directly above. The carrier 905 may be one of an electronic signal, an optical signal, a radio signal, and a computer readable medium.

In some embodiments, the processing module 901 comprises an Input/Output (I/O) unit 906, which may be exemplified by or implemented as a receiving module and/or a sending module as described below, when applicable.

In further embodiments, the user equipment 110 and/or the processing module 901 may comprise one or more of a receiving module 910, a sending module 920 as exemplifying hardware modules. In other examples, the aforementioned exemplifying hardware module may be implemented as one or more software modules. These modules are configured to perform a respective action as illustrated in e.g. FIG. 7.

Therefore, according to the various embodiments described above, the user equipment 110 is, e.g. by means of the processing module 901 and/or any of the above mentioned modules, operative to, e.g. is configured to, perform the method of FIGS. 2B, 5B, 7, and/or 8.

Figure 10:
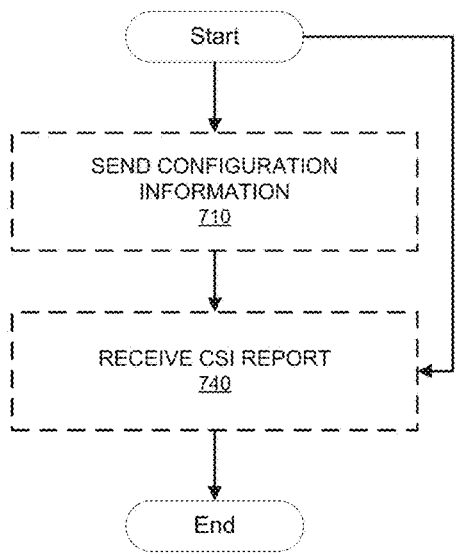
FIG. 10 is a logic flow diagram of a method performed by a radio network node according to some embodiments.

In FIG. 10, an exemplifying, schematic flowchart of the method in the radio network node 120 is shown. The same reference numerals as used in connection with FIG. 7 have been applied to denote the same or similar actions. The illustrated actions may be performed in any suitable order.

Figure 11:
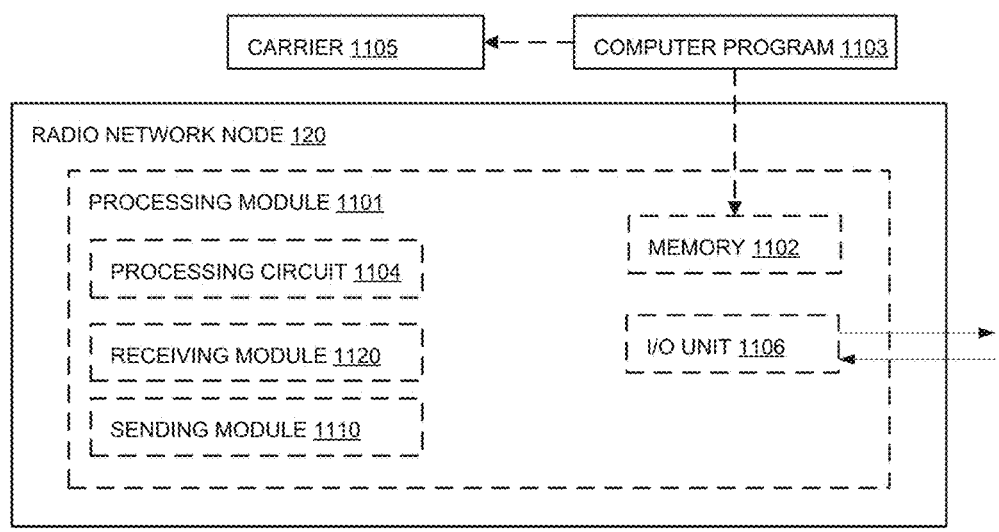
FIG. 11 is a block diagram of a radio network node, computer program, and/or carrier, according to one or more embodiments.

With reference to FIG. 11, a schematic block diagram of the radio network node 120 is shown. The radio network node 120 may comprise a processing module 1101, such as a means, one or more hardware modules and/or one or more software modules for performing the methods described herein. The radio network node 120 may further comprise a memory 1102. The memory may comprise, such as contain or store, a computer program 1103.

According to some embodiments herein, the processing module 1101 comprises, e.g. 'is embodied in the form of' or 'realized by', a processing circuit 1104 as an exemplifying hardware module. In these embodiments, the memory 1102 may comprise the computer program 1103, comprising computer readable code units executable by the processing circuit 1104, whereby the radio network node 120 is operative to perform the methods of e.g. FIGS. 2A, 5A, 7, and/or 10.

FIG. 11 further illustrates a carrier 1105, that may comprise the computer program 1103 described directly above. The carrier 1105 may be one of an electronic signal, an optical signal, a radio signal, and a computer readable medium.

In some embodiments, the processing module 1101 comprises an Input/Output (I/O) unit 1106, which may be exemplified by or implemented as a receiving module and/or a sending module as described below, when applicable.

In further embodiments, the radio network node 120 and/or the processing module 1101 may comprise one or more of a receiving module 1120, a sending module 1110 as exemplifying hardware modules. In other examples, the aforementioned exemplifying hardware module may be implemented as one or more software modules. These modules are configured to perform a respective action as illustrated in e.g. FIGS. 2A, 5A, 7, and/or 10.

Therefore, according to the various embodiments described above, the radio network node 120 is, e.g. by means of the processing module 1101 and/or any of the above mentioned modules, operative to, e.g. is configured to, perform the method of e.g. FIGS. 2A, 5A, 7, and/or 10.

While the above description focus on downlink where UE receives downlink data and performs CSI estimation, the same principle applies to uplink as well, where the UE transmits uplink data and eNB estimates UL channel quality based on UL signal.

Similarly, the same principle applies regardless of duplex mode, where the UE can operate in full-duplex Frequency-Division Duplexing (FDD), or Time-Division Duplexing (TDD), or half-duplex FDD mode.

Note that various embodiments herein were described using Long Term Evolution (LTE) as an example. In these and other embodiments, to support link adaptation for the downlink, a UE reports channel state information (CSI) to the eNB, where the CSI comprises Channel Quality Indicator (CQI), precoding matrix indicator (PMI), precoding type indicator (PTI), rank indication (RI), and/or CSI-RS indictor (CRI). The UE performs aperiodic CSI reporting using PUSCH, and periodic CSI reporting using PUCCH. A UE may be semi-statically configured by higher layers to feed back CQI and PMI and corresponding RI on the same PUSCH using one of the following CSI reporting modes given in Table 7.2.1-1 of TS 36.213 (shown in FIG. 12). And a UE may be semi-statically configured by higher layers to periodically feed back different CSI components (CQI, PMI, PTI, and/or RI) on the PUCCH using the reporting modes given in Table 7.2.2-1 of TS 36.213 (shown in FIG. 13).

According to the LTE-based embodiments described herein as well as other embodiments not limited to LTE, there is provided several methods to provide wide-band and sub-band CQI report for Rel-13 MTC UE with a reduced RF bandwidth. Both periodic and aperiodic CSI reporting are covered. The embodiments herein provide support for an MTC UE of 1.4 MHz RF bandwidth in a LTE system with a system bandwidth that is wider than 1.4 MHz.

Various advantages of some such embodiments include for instance that wideband CQI report is redefined over a 6-PRB group configured for a low-complexity and/or coverage-enhanced (LC/CE) UE. The subband CQI report is redefined over sub-subband within the 6-PRB group configured for a LC/CE UE. And higher layer signaling to provide the 6-PRB group configuration is described.

In other examples, though, the wireless communication system 100 may be any cellular system, such as a Global System for Mobile Communications (GSM), Universal Mobile Telecommunication System (UMTS) and Worldwide Interoperability for Microwave Access (WiMAX) allowing a layer of D2D communications or the like.

As used herein, the term "radio network node" may refer to an evolved Node B (eNB or eNodeB), a Radio Network Controller (RNC), a Radio Base Station (RBS), a control node controlling one or more Remote Radio Units (RRUs), an access point or the like.

As used herein, the term "user equipment" may refer to a wireless device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. Sometimes, the term "user" may be used to refer to the user equipment or the like as above. It shall be understood that the user may not necessarily involve a human user. The term "user" may also refer to a machine, a software component or the like using certain functions, methods and similar.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner.

As used herein, the term "unit" may refer to one or more functional units, each of which may be implemented as one or more hardware modules and/or one or more software modules in a node.

As used herein, the term "program carrier" may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific Integrated Circuit (ASIC), a Field-Programmable Gate Array (FPGA) or the like. The processing circuit or the like may comprise one or more processor kernels.

As used herein, the expression "configured to" may mean that a processing circuit is configured to, or adapted to, by means of software configuration and/or hardware configuration, perform one or more of the actions described herein.

As used herein, the term "action" may refer to an action, a step, an operation, a response, a reaction, an activity or the like.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a Memory Stick, a Multimedia Card (MMC), Secure Digital (SD) card, etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Throughout the description similar reference numerals have been used to denote similar features, such as actions, steps, nodes, elements, units, modules, circuits, parts, items or the like, when applicable. In the Figures, features that appear in some embodiments are indicated by dashed lines.

Even though embodiments of the various aspects have been described, many different alterations, modifications and the like thereof will become apparent for those skilled in the art. The described embodiments are therefore not intended to limit the scope of the present disclosure. Accordingly the described embodiments may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a radio network node configured to operate within a system bandwidth comprising multiple subbands and to serve a user equipment limited to operating within only one subband during any given subframe, the method comprising:
    generating configuration information that indicates a mode according to which the user equipment is to feed back channel state information to the radio network node, wherein according to the indicated mode, in a subframe where channel quality indicator (CQI) is reported, the user equipment shall report one wideband value which is calculated assuming transmission on the subband within which the user equipment is configured to operate in that subframe; and
    configuring the user equipment to feed back the channel state information according to the indicated mode by transmitting the configuration information to the user equipment.

2. The method of claim 1, wherein according to the indicated mode the user equipment shall calculate a wideband CQI value conditioned on a transmission rank of one, and shall not transmit a transmission rank indicator as part of the channel state information.

3. The method of claim 1, wherein according to the indicated mode a wideband CQI value represents channel quality for a single codeword.

4. The method of claim 1, wherein according to the indicated mode the user equipment shall periodically feed back the channel state information to the radio network node.

5. The method of claim 4, wherein according to the indicated mode the channel state information that the user equipment is to feed back includes a wideband CQI value, but not a precoding matrix indicator.

6. The method of claim 4, wherein according to the indicated mode the channel state information that the user equipment is to feed back also includes a single precoding matrix indicator (PMI) wherein, in the subframe where CQI and PMI are reported, a single precoding matrix is selected from a codebook subset assuming transmission on the subband within which the user equipment is configured to operate in that subframe.

7. The method of claim 6, wherein according to the indicated mode the user equipment shall calculate the single PMI conditioned on a transmission rank of one.

8. The method of claim 4, wherein the user equipment is of a type for which only two modes are supported for periodically reporting the channel state information, including the indicated mode, wherein the two modes comprise:
    a mode according to which the channel state information that the user equipment is to feed back includes a wideband CQI value, but not a precoding matrix indicator; and
    a mode according to which the channel state information that the user equipment is to feed back also includes a single precoding matrix indicator (PMI) wherein, in the subframe where CQI and PMI are reported, a single precoding matrix is selected from a codebook subset assuming transmission on the subband within which the user equipment is configured to operate in that subframe.

9. The method of claim 1, wherein according to the indicated mode the user equipment shall aperiodically feed back the channel state information to the radio network node.

10. The method of claim 9, wherein according to the indicated mode the channel state information that the user equipment is to feed back includes a wideband CQI value, but not a precoding matrix indicator.

11. The method of claim 9, wherein the user equipment is of a type for which the indicated mode is the only mode supported for aperiodically reporting the channel state information.

12. The method of claim 9, wherein according to the indicated mode the user equipment shall report at least one differential CQI value that is encoded differentially relative to a wideband CQI value.

13. The method of claim 1, wherein the configuration information is transmitted to the user equipment in a radio resource control (RRC) message.

14. The method of claim 1, wherein the user equipment is a low-complexity and/or coverage-enhanced (LC/CE) user equipment in a Long Term Evolution (LTE) system.

15. The method of claim 1, wherein the configuration information also indicates a location within the system bandwidth of a single subband within which the user equipment is to be operated during any given subframe.

16. A method implemented by a user equipment served by a radio network node, wherein the radio network node is configured to operate within a system bandwidth comprising multiple subbands, wherein the user equipment is limited to operating within only one subband during any given subframe, the method comprising:
    receiving from the radio network node configuration information that indicates a mode according to which the user equipment is to feed back channel state information to the radio network node, wherein according to the indicated mode, in a subframe where channel quality indicator (CQI) is reported, the user equipment shall report one wideband CQI value which is calculated assuming transmission on the subband within which the user equipment is configured to operate in that subframe; and
    configuring the user equipment to feed back the channel state information according to the indicated mode.

17. The method of claim 16, wherein according to the indicated mode the user equipment shall calculate the wideband CQI value conditioned on a transmission rank of one, and shall not transmit a transmission rank indicator as part of the channel state information.

18. The method of claim 16, wherein according to the indicated mode the wideband CQI value represents channel quality for a single codeword.

19. The method of claim 16, wherein according to the indicated mode the user equipment shall periodically feed back the channel state information to the radio network node.

20. The method of claim 19, wherein according to the indicated mode the channel state information that the user equipment is to feed back includes the wideband CQI value, but not a precoding matrix indicator.

21. The method of claim 19, wherein according to the indicated mode the channel state information that the user equipment is to feed back also includes a single precoding matrix indicator (PMI) wherein, in the subframe where CQI and PMI are reported, a single precoding matrix is selected from a codebook subset assuming transmission on the subband within which the user equipment is configured to operate in that subframe.

22. The method of claim 21, wherein according to the indicated mode the user equipment shall calculate the single PMI conditioned on a transmission rank of one.

23. The method of claim 19, wherein the user equipment is of a type for which only two modes are supported for periodically reporting the channel state information, including the indicated mode, wherein the two modes comprise:
 a mode according to which the channel state information that the user equipment is to feed back includes the wideband CQI value, but not a precoding matrix indicator; and
 a mode according to which the channel state information that the user equipment is to feed back also includes a single precoding matrix indicator (PMI) wherein, in the subframe where CQI and PMI are reported, a single precoding matrix is selected from a codebook subset assuming transmission on the subband within which the user equipment is configured to operate in that subframe.

24. The method of claim 16, wherein according to the indicated mode the user equipment shall aperiodically feed back the channel state information to the radio network node.

25. The method of claim 24, wherein according to the indicated mode the channel state information that the user equipment is to feed back includes the wideband CQI value, but not a precoding matrix indicator.

26. The method of claim 24, wherein the user equipment is of a type for which the indicated mode is the only mode supported for aperiodically reporting the channel state information.

27. The method of claim 24, wherein according to the indicated mode the user equipment shall report at least one differential CQI value that is encoded differentially relative to the wideband CQI value.

28. The method of claim 16, wherein the configuration information is transmitted to the user equipment in a radio resource control (RRC) message.

29. The method of claim 16, wherein the user equipment is a low-complexity and/or coverage-enhanced (LC/CE) user equipment in a Long Term Evolution (LTE) system.

30. The method of claim 16, wherein the configuration information also indicates a location within the system bandwidth of a single subband within which the user equipment is to be operated during any given subframe.

31. A radio network node configured to operate within a system bandwidth comprising multiple subbands and to serve a user equipment limited to operating within only one subband during any given subframe, the radio network node comprising:
 a processor and a memory, the memory containing instructions executable by the processor whereby the radio network node is configured to:
  generate configuration information that indicates a mode according to which the user equipment is to feed back channel state information to the radio network node, wherein according to the indicated mode, in a subframe where channel quality indicator (CQI) is reported, the user equipment shall report one wideband CQI value which is calculated assuming transmission on the subband within which the user equipment is configured to operate in that subframe; and
  configure the user equipment to feed back the channel state information according to the indicated mode by transmitting the configuration information to the user equipment.

32. The radio network node of claim 31, wherein according to the indicated mode the user equipment shall calculate the wideband CQI value conditioned on a transmission rank of one, and shall not transmit a transmission rank indicator as part of the channel state information.

33. The radio network node of claim 31, wherein according to the indicated mode the wideband CQI value represents channel quality for a single codeword.

34. The radio network node of claim 31, wherein according to the indicated mode the user equipment shall periodically feed back the channel state information to the radio network node.

35. The radio network node of claim 34, wherein according to the indicated mode the channel state information that the user equipment is to feed back includes the wideband CQI value, but not a precoding matrix indicator.

36. The radio network node of claim 34, wherein according to the indicated mode the channel state information that the user equipment is to feed back also includes a single precoding matrix indicator (PMI) wherein, in the subframe where CQI and PMI are reported, a single precoding matrix is selected from a codebook subset assuming transmission on the subband within which the user equipment is configured to operate in that subframe.

37. The radio network node of claim 36, wherein according to the indicated mode the user equipment shall calculate the single PMI conditioned on a transmission rank of one.

38. The radio network node of claim 34, wherein the user equipment is of a type for which only two modes are supported for periodically reporting the channel state information, including the indicated mode, wherein the two modes comprise:
 a mode according to which the channel state information that the user equipment is to feed back includes the wideband CQI value, but not a precoding matrix indicator; and
 a mode according to which the channel state information that the user equipment is to feed back also includes a single precoding matrix indicator (PMI) wherein, in the subframe where CQI and PMI are reported, a single precoding matrix is selected from a codebook subset assuming transmission on the subband within which the user equipment is configured to operate in that subframe.

39. The radio network node of claim 31, wherein according to the indicated mode the user equipment shall aperiodically feed back the channel state information to the radio network node.

40. The radio network node of claim 39, wherein according to the indicated mode the channel state information that the user equipment is to feed back includes the wideband CQI value, but not a precoding matrix indicator.

41. The radio network node of claim 39, wherein the user equipment is of a type for which the indicated mode is the only mode supported for aperiodically reporting the channel state information.

42. The radio network node of claim 39, wherein according to the indicated mode the user equipment shall report at least one differential CQI value that is encoded differentially relative to the wideband CQI value.

43. The radio network node of claim 31, wherein the configuration information is transmitted to the user equipment in a radio resource control (RRC) message.

44. The radio network node of claim 31, wherein the user equipment is a low-complexity and/or coverage-enhanced (LC/CE) user equipment in a Long Term Evolution (LTE) system.

45. The radio network node of claim 31, wherein the configuration information also indicates a location within the system bandwidth of a single subband within which the user equipment is to be operated during any given subframe.

46. A user equipment served by a radio network node, wherein the radio network node is configured to operate within a system bandwidth comprising multiple subbands, wherein the user equipment is limited to operating within only one subband during any given subframe, the user equipment comprising:
   a processor and a memory, the memory containing instructions executable by the processor whereby the user equipment is configured to:
      receive from the radio network node configuration information that indicates a mode according to which the user equipment is to feed back channel state information to the radio network node, wherein according to the indicated mode, in a subframe where channel quality indicator, CQI, is reported, the user equipment shall report one wideband CQI value which is calculated assuming transmission on the subband within which the user equipment is configured to operate in that subframe; and
      configure the user equipment to feed back the channel state information according to the indicated mode.

47. The user equipment of claim 46, wherein according to the indicated mode the user equipment shall calculate the wideband CQI value conditioned on a transmission rank of one, and shall not transmit a transmission rank indicator as part of the channel state information.

48. The user equipment of claim 46, wherein according to the indicated mode the wideband CQI value represents channel quality for a single codeword.

49. The user equipment of claim 46, wherein according to the indicated mode the user equipment shall periodically feed back the channel state information to the radio network node.

50. The user equipment of claim 49, wherein according to the indicated mode the channel state information that the user equipment is to feed back includes the wideband CQI value, but not a precoding matrix indicator.

51. The user equipment of claim 49, wherein according to the indicated mode the channel state information that the user equipment is to feed back also includes a single precoding matrix indicator (PMI) wherein, in the subframe where CQI and PMI are reported, a single precoding matrix is selected from a codebook subset assuming transmission on the subband within which the user equipment is configured to operate in that subframe.

52. The user equipment of claim 51, wherein according to the indicated mode the user equipment shall calculate the single PMI conditioned on a transmission rank of one.

53. The user equipment of claim 49, wherein the user equipment is of a type for which only two modes are supported for periodically reporting the channel state information, including the indicated mode, wherein the two modes comprise:
   a mode according to which the channel state information that the user equipment is to feed back includes the wideband CQI value, but not a precoding matrix indicator; and
   a mode according to which the channel state information that the user equipment is to feed back also includes a single precoding matrix indicator (PMI) wherein, in the subframe where CQI and PMI are reported, a single precoding matrix is selected from a codebook subset assuming transmission on the subband within which the user equipment is configured to operate in that subframe.

54. The user equipment of claim 46, wherein according to the indicated mode the user equipment shall aperiodically feed back the channel state information to the radio network node.

55. The user equipment of claim 54, wherein according to the indicated mode the channel state information that the user equipment is to feed back includes the wideband CQI value, but not a precoding matrix indicator.

56. The user equipment of claim 54, wherein the user equipment is of a type for which the indicated mode is the only mode supported for aperiodically reporting the channel state information.

57. The user equipment of claim 54, wherein according to the indicated mode the user equipment shall report at least one differential CQI value that is encoded differentially relative to the wideband CQI value.

58. The user equipment of claim 46, wherein the configuration information is transmitted to the user equipment in a radio resource control (RRC) message.

59. The user equipment of claim 46, wherein the user equipment is a low-complexity and/or coverage-enhanced (LC/CE) user equipment in a Long Term Evolution (LTE) system.

60. The user equipment of claim 46, wherein the configuration information also indicates a location within the system bandwidth of a single subband within which the user equipment is to be operated during any given subframe.

61. A non-transitory computer readable medium comprising a computer program product stored in a non transitory computer readable medium thereon for controlling a radio network node configured to operate within a system bandwidth comprising multiple subbands and to serve a user equipment limited to operating within only one subband during any given subframe, the computer program product comprising software instructions which, when run on a processing circuit of the radio network node, causes the radio network node to:
   generate configuration information that indicates a mode according to which the user equipment is to feed back channel state information to the radio network node, wherein according to the indicated mode, in a subframe where channel quality indicator (CQI) is reported, the user equipment shall report one wideband CQI value which is calculated assuming transmission on the subband within which the user equipment is configured to operate in that subframe; and configure the user equipment to feed back the channel state information according to the indicated mode by transmitting the configuration information to the user equipment.

62. A non-transitory computer readable medium comprising a computer program product stored thereon for controlling a user equipment served by a radio network node, wherein the radio network node is configured to operate within a system bandwidth comprising multiple subbands, wherein the user equipment is limited to operating within only one subband during any given subframe, the computer program product comprising software instructions which, when run on a processing circuit of the user equipment, causes the user equipment to:

receive from the radio network node configuration information that indicates a mode according to which the user equipment is to feed back channel state information to the radio network node, wherein according to the indicated mode, in a subframe where channel quality indicator (CQI) is reported, the user equipment shall report one wideband CQI value which is calculated assuming transmission on the subband within which the user equipment is configured to operate in that subframe; and configure the user equipment to feed back the channel state information according to the indicated mode.

* * * * *

UNITED STATES PATENT AND TRADEMARK OFFICE
CERTIFICATE OF CORRECTION

PATENT NO. : 10,135,674 B2  
APPLICATION NO. : 15/138608  
DATED : November 20, 2018  
INVENTOR(S) : Blankenship et al.

Page 1 of 1

It is certified that error appears in the above-identified patent and that said Letters Patent is hereby corrected as shown below:

In the Specification

In Column 1, Line 9, delete "2016" and insert -- 2016, now Pat. No. 9,929,902, --, therefor.

In Column 1, Line 10, delete "PCT/SE2016/05007" and insert -- PCT/SE2016/050072 --, therefor.

In Column 7, Lines 12-13, delete "(Block 205)." and insert -- (Block 505). --, therefor.

In Column 14, Line 64, delete "action 730," and insert -- action 740, --, therefor.

In the Claims

In Column 24, Lines 54-55, in Claim 61, delete "stored in a non transitory computer readable medium thereon" and insert -- stored thereon --, therefor.

Signed and Sealed this  
Thirty-first Day of March, 2020

Andrei Iancu  
*Director of the United States Patent and Trademark Office*